3,031,382
FERMENTATION PROCESS USING SPORE
FORMING FUNGI
Stanley G. Knight, Madison, Wis., assignor to Wisconsin Alumni Research Foundation, Madison, Wis., a corporation of Wisconsin
No Drawing. Filed Sept. 15, 1958, Ser. No. 760,840
7 Claims. (Cl. 195—101)

The present invention relates to the microbiological production of chemical compounds by conidia or conidiospores (commonly called spores) produced during fermentation of a vegetative inoculum in an aqueous nutrient medium, and more specifically to the improvement which consists in the production of the compounds with the spores substantially free from vegetative inoculum in a substantially nutrient-free aqueous medium. The spores, unlike vegetative inoculum which is made up of vegetative growth material, i.e. mycelium, are substantially free from vegetative growth material. Also, unlike vegetative inoculum which requires a special fermentation nutrient medium, the spores do not require a nutrient medium.

Heretofore, microbiological production of chemical compounds was carried out with vegetative inoculum in a fermentation medium containing nutrients such as corn-steep liquor, soybean oil, soybean meal, molasses, sucrose, etc. to provide assimilable sources of nitrogen and carbon. See Fried et al. Patent 2,753,290 and Thoma et al. Patent 2,793,162. The vegetative inoculum used was also made up of strong, young mycelium cells known to be substantially spore-free but metabolically very active. Recovery of the modified chemicals from a medium containing vegetative growth material, nutrients, particularly the complex organic nutrients, by-products of the same, etc. obviously posed problems. Vegetative inoculum and organic nutrients, however, were used as they were considered essential in this art.

During my investigations of the conversion of fats, e.g. milk fat, to highly flavored compositions with molds of the Penicillium type, e.g. P. roqueforti, it was noted that the fermentation period using vegetative inoculum (mold cells in mycelium form with nutrient growth medium) was relatively short, e.g. 2 days, compared to the fermentation, e.g. 4 days, using mold conidia or conidio-spores. See copending Knight application, Serial No. 672,557, filed July 18, 1957, now abandoned. It was also noted that the fermentation period using e.g. 7 day old, spore containing vegetative inoculum or spores alone was longer than that required with young, e.g. 2 day old, substantially spore-free vegetative inoculum. In view of this it was assumed that the spores as such were relatively inert and that vegetative inoculum and preferably young inoculum should be used. Investigations also disclosed that the fermentation mechanism apparently proceeded first by the hydrolysis or splitting of the fats and then by the conversion of the resulting free fatty acids to the desired highly flavored aromatic ketones. It was also noted that the development of the desired flavor could be hastened by the addition of small amounts of lipase or like fat splitting enzyme. See Farnham Patent 2,531,329 and Knight application, supra. Up to this time, however, it appeared that the use of vegetative inoculum with accompanying growth media (with or without added fat splitting enzymes) was necessary for short fermentation periods, although it was appreciated that the use of spores was otherwise advantageous in that it was easier, using a spore inoculum, to avoid or control unwanted secondary reactions caused by bacteria, etc.

In continued investigations it was noted, after lipase modified the milk fat, that the resulting mixture containing free fatty acids was converted to the desired highly flavored composition much more rapidly by the old spore containing vegetative inoculum, in which the cells were relatively inactive, than by the young substantially spore-free inoculum, in which cells were known to be relatively active. With this unexpected discovery it was then decided to try the following experiment. Milk fat was first modified with lipase to release free fatty acids. Conidia or conidiospores of *Penicillium roqueforti* were then added to the modified fat (free fatty acid) mixture and the mixture subjected to fermentation under submerged aerobic conditions. In a matter of minutes it was noted that the spores (heretofore considered inert) were converting the free fatty acids to ketones. Instead of days, the desired flavor was obtained in this manner in 2–3 hours.

Investigations based on the above have shown that the young active vegetative inoculum provides enzymes for splitting the fat and that the free acids are then converted to ketones when spores are produced in the old relatively inactive vegetative inoculum. In this action the spores introduce a ketone (C=O) group on the number 2 carbon atom and then decarboxylate the fatty acid. This can be illustrated as follows:

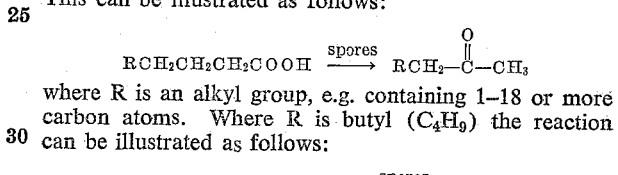

where R is an alkyl group, e.g. containing 1–18 or more carbon atoms. Where R is butyl ($C_4H_9$) the reaction can be illustrated as follows:

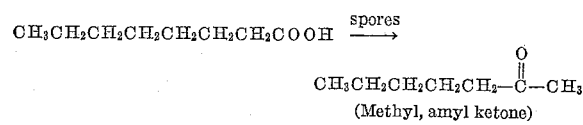

(Methyl, amyl ketone)

Free fatty acids can be used as such where available and where not available they can be made readily by acid hydrolysis of fats or by modification of the corresponding fats by use of fat splitting enzymes such as lipase. While homogenization of the fat or fatty acid is not essential where the process is carried out with agitation or agitation accompanying aeration, the use of homogenized fat such as in homogenized milk fat is preferred both for the conversion of the fat to free fatty acid by the enzymes and the conversion of the fatty acid to the ketone by the spores. The overall action of the enzymes and spores is materially speeded up when the fat and fatty acid are dispersed in minute particles to provide large areas of surface.

The spores used in the present invention can be readily obtained from vegetative inoculum which has been allowed to grow for 4–6 days in submerged culture with aeration (e.g. shaking) in an aqueous cornsteep liquor-lactose or other nutrient medium in accordance with standard practices (except for culturing period) used to prepare vegetative inoculum. The spores present in the old vegetative inoculum are harvested by first straining through cheesecloth to remove most of the mycelium and then by filtering through glass wool to remove the remaining mycelium. The spores in the filtrate are recovered by centrifuging and are then washed with water to remove any retained nutrients. They may be stored in dry form or resuspended in distilled water and be kept at 4° C. The suspension can be standardized to contain, for example, about one billion spores/ml. The spores can also be grown on surface culture, e.g. nutrient agar, and after scraping off the spores and suspending in water, the spores can be recovered in substantially pure form by filtering, centrifuging, etc., as described above.

The spore containing old vegetative inoculum can also be used as such and, while this introduces vegetative growth and some nutrients into the mixture, it represents a material improvement over the use of the nutrient fermentation mixtures. When the vegetative inoculum is used it can be recovered in fairly pure form free from soluble nutrients by centrifuging and by washing the recovered solids with water. The use of spores, however, substantially free from both vegetative growth and nutrients is preferred.

The following examples are illustrative.

*Example I*

About 10 mg. of lipase is first added to about 1000 ml. of homogenized milk containing added cream to provide about 12% milk fat and the mixture shaken for about 4 hours at 37° C. The resulting fatty acid mixture is next steamed for about 10 minutes to kill the lipase. After cooling to 25° C., 200 ml. of an aqueous dispersion of conidia or conidiospores of a white mutant of *P. roqueforti*, prepared as described above, and containing about a billion spores/ml., substantially free from vegetative inoculum and nutrients, are added to the fatty acid mixture and the resulting mixture agitated with aeration at about 1 vol./min. at a temperature of about 25° C. for about 2.5 hours. The resulting highly flavored composition containing aromatic ketones derived from the fatty acids can be concentrated and used as such or be obtained in dry form by spray drying in accordance with established practices in the drying art. The white mutant used in this example can be prepared as described in the references cited in the Knight application, supra.

The 1 mg./100 ml. ratio of lipase to milk is merely illustrative as the amounts, depending on the percent of fat, temperature, time, etc. can vary widely with optimum amounts for a particular composition being readily ascertained by preliminary test. The same applies to the amount of spores used as the optimum amount (which can also be ascertained by preliminary test) can vary under different reaction conditions, different kind of spores, etc.

*Example II*

To a 1% aqueous mixture of octanoic acid buffered with phosphate buffer to pH 6.5 is added conidia or conidio-spores of *P. roqueforti*, substantially free from vegetative inoculum and nutrients, in a ratio of about 100,000,000 spores/3 ml. of the aqueous octanoic acid mixture. The mixture is then subjected to agitation with aeration for about 2 hours at about 25° C. The resulting methyl, amyl ketone can be recovered by distillation or like means known in the art.

*Example III*

This example follows Example II using hexanoic acid, nonanoic acid and decanoic acid, respectively, for the preparation of methyl, propyl ketone; methyl, hexyl ketone, and methyl, heptyl ketone. By selecting the appropriate fatty acid containing at least 4 carbon atoms other ketones can be prepared in a similar manner without vegetative inoculum or nutrients.

*Example IV*

This example is in accordance with the above examples but employs 4–5 day old spore containing vegetative inoculum which has been centrifuged to remove water-soluble nutrients, dried and then ground to a powder and resuspended in water. The ketones can be recovered by distillation, extraction with water immiscible solvents, decantation where the ketone is insoluble in water, etc. Separation of the ketones is not required when making a flavoring composition as in Example I.

In addition to converting fatty acids to ketones the improved process of the present invention employing conidia or conidiospores can be used to advantage for the modification of other compounds including steroids or steroid intermediates. The process is carried out in the same manner as the processes in the references including the patents noted below, for example, except that the fermentation of the vegetative inoculum in the nutrient medium, as used in the references and heretofore, is replaced by the spores of the specified organism, substantially free from vegetative growth material, and the reaction is carried out in a substantially nutrient-free aqueous medium. If necessary, the aqueous mixtures should be buffered to provide a pH of about 6.5–7.5. The following microbial modifications of steroids are illustrative:

(1) Reduction of progesterone to $\Delta^4$-pregnene-20$\beta$-ol-3-one with *Streptomyces lavendulae*. Fried, J., et al., J. Am. Chem. Soc. 75:5764 (1953).

(2) Dehydrogenation of secondary alcohols:

(a) $\Delta^5$-androstene-3$\beta$,17$\beta$-diol to testosterone with *Proactinomyes erythropolis*. Turfitt, G. E., Biochem. J. 40:79 (1946).

(b) Estradiol to estrone with *Streptomyces albus*. Welsch, M., et al., Compt. rend. soc. biol, 142:1074 (1948).

(3) Hydroxylation in position 1: $\Delta^4$-androstene-3,17-dione to $\Delta^4$-androstene-1$\alpha$-ol-3,17-dione with *Penicillium sp.*, Dodson, R. M., et al., J. Am. Chem. Soc. 79:3921 (1957).

(4) Hydroxylation in position 2: $\Delta^4$-pregnene-17$\alpha$,21-diol-3,20-dione to $\Delta^4$-pregnene-2$\beta$,17$\alpha$,21-triol-3,20-dione with *Streptomyces sp.*, Herzog, H. L., et al., J. Am. Chem. Soc. 79:3922 (1957).

(5) Hydroxylation in position 6: Progesterone to $\Delta^4$-pregnene-6$\beta$-ol-3,20-dione with *Streptomyces aureofaciens*. Fried, J., et al., Recent Progr. Hormone Res. 11:157 (1955). See also Dulaney, E. L., et al., Mycologia 47:464 (1955); Fried, J., et al., J. Am. Chem. Soc. 74:3962 (1952); Meister, P. D., et al., J. Am. Chem. Soc. 75:416 (1953) and Eppstein, S. H., et al., J. Am. Chem. Soc. 75:408 (1953) involving the microorganisms *Aspergillus ochraceus*, *Aspergillus niger*, and *Rhizopus arrhizus*.

(6) Hydroxylation in position 7: Progesterone to $\Delta^4$-pregnene-7$\alpha$-ol-3,20-dione with *Phycomyces blakesleeanus*. Fried et al., U.S. Patent 2,753,290. See also Meystre, C., et al., Helv. Chim. Acta 38:381 (1955) using a species of Peziza for a similar type reaction on deoxycorticosterone.

(7) Hydroxylation in positions 10, 11 or 12:

(a) 19-nor-progesterone to 10ε-hydroxyl-19-nonprogesterone with *Rhizopus nigricans*. Pederson, R. L., et al., J. Am. Chem. Soc. 78:1512 (1956).

(b) Progesterone to $\Delta^4$-pregnene-11$\alpha$-ol-3,20-dione with *Rhizopus arrhizus*. Peterson, D. H., et al., J. Am. Chem. Soc. 74:1871 (1952). See also Peterson, D. H., et al., J. Am. Chem. Soc. 75:412 (1953).

(c) Reichstein's compound S ($\Delta^4$-pregnene 17$\alpha$,21-diol-3,20-dione) to hydrocortisone ($\Delta^4$-pregnene-11$\beta$,17$\alpha$,21-triol-3,20-dione with *Cunninghamella blakesleeana*. Hanson, F. R., et al., J. Am. Chem. Soc. 75:5369 (1953). See also Shull, G. M., et al., J. Am. Chem. Soc. 77:763 (1955), and Thoma et al., U.S. Patent 2,793,162 involving similar reactions with *Curvularia lunata*, *Trichothecium roseum*, and *Coniothyrium hellebori*.

(d) Progesterone to $\Delta^4$-pregnene-12$\beta$-ol-3,20-dione and the related 12$\beta$,15$\beta$-diol with *Calonectria decora*. Schubert, A., et al., Ber. 90, 2576 (1957).

(8). Hydroxylation in other positions are described in Meister, P. D., et al., Absts. 123rd meeting Am. Chem. Soc. (1953); Fried et al., U.S. Patent 2,753,290; Camerino, B., et al., Gazz. Chim. ital., 86:1226 (1956); Meystre, C., et al., Helv. Chim. Acta 38:381 (1955); Perlman, D., et al., J. Am. Chem. Soc. 74:2126 (1952); Thoma, R. W., et al., J. Am. Chem. Soc. 79:4818 (1957); Dulaney, E. L., et al., Appl. Microbiol. 3:372 (1955); Meystre, C., et al., Helv. Chim Acta 37:1548 (1954); McAleer, W. J., et al., Arch. Biochem. Biophys. 62:109 (1956).

(9) Dehydrogenation: Hydrocortisone to $\Delta'$-4-pregnadiene-11β,17α,21-triol-3,20-dione with *Streptomyces lavendulae*. Fried et al., U.S. Patent 2,793,164. See also Mobile, A., et al., J. Am. Chem. Soc. 77:4184 (1955); Vischer, E., et al., Helv. Chim. Acta 38:835 (1955).

(10) Side chain degradation: Progesterone to Δ′-4-androstadiene-3,20-dione with *Streptomyces lavendulae*. Peterson, G. E., et al., J. Bact. 74:684 (1957). See also Vischer, E., et al., Experienta 9:371 (1953); Turfitt, G. E., Biochem. J. 42:376 (1948).

See also U.S. Patents 2,602,769; 2,649,400; 2,649,401; 2,649,402; 2,695,260; 2,735,800; 2,753,290; 2,762,747; 2,768,928; 2,789,940; 2,802,775; 2,809,919; 2,812,285; and 2,830,937 which involve microorganisms forming spores which can be used in a nutrient-free medium in place of the vegetative inoculum in the described processes. Patents 2,602,769 and 2,735,800 listed above, use fungus of the order Mucorales.

As noted above, the processes are carried out in accordance with the processes described in the references except (1) that the vegetative inoculum employed in the reference process is replaced by spores of the organism substantially free from vegetative growth material and (2) that the aqueous nutrient fermentation medium employed in the reference process is replaced by a substantially nutrient-free aqueous medium. The time required to complete the conversion with spores (and which can be readily ascertained by preliminary tests in each case) is materially shortened and the yield materially increased over that using a young vegetative inoculum. Aside from the time element, however, the recovery of the modified chemical in good yield (which, here again, can be carried out in accordance with the reference process) is much easier from the relatively clean reaction mixture of the present invention than the prior art fermentation mixtures containing vegetative growth, organic nutrients, by-products of the same, etc. Purification of the modified compound after isolation is also much easier in the process of the present invention than is possible from the highly contaminated culture filtrates resulting from the fermentation of vegetative inoculum in a nutrient medium.

As noted above lipase can be used to release free fatty acids from milk fat. In the illustrative examples spores are added to the resulting mixture and free fatty acids are converted to ketones. Whereas in these examples the reactions are conducted separately it should be understood that the enzymes and spores can be used simultaneously.

I claim:

1. In the microbiological production of a chemical compound by fermentation of a spore forming fungi in an aqueous nutrient medium containing assimilable sources of nitrogen and carbon in which the spores can germinate and grow and produce vegetative growth material, the improvement which consists in first producing the spores by fermenting the spore forming fungi in said nutrient medium, separating the spores from the resulting fermentation medium containing vegetative growth and nutrient materials and carrying out the production of the compound with the spores in a substantially vegetative growth material-free and nutrient-free aqueous medium in which the spores cannot germinate.

2. The process of claim 1 where the compounds are fatty acids.

3. In the microbiological production of a chemical compound by fermentation of a fungi of the genus Streptomyces, the improvement which consists in first producing spores and vegetative growth material by culturing the fungi in a nutrient medium, separating the spores from the vegetative growth and nutrient materials, and carrying out the production of the compound with the spores in a substantially vegetative growth material-free and nutrient-free aqueous medium in which the spores cannot germinate.

4. In the microbiological production of a chemical compound by fermentation of a fungi of the genus Penicillium, the improvement which consists in first producing spores and vegetative growth material by culturing the fungi in a nutrient medium, separating the spores from the vegetative growth and nutrient materials, and carrying out the production of the compound with the spores in a substantially vegetative growth material-free and nutrient-free aqueous medium in which the spores cannot germinate.

5. In the microbiological production of a chemical compound by fermentation of a fungi of the genus Aspergillus, the improvement which consists in first producing spores and vegetative growth material by culturing the fungi in a nutrient medium, separating the spores from the vegetative growth and nutrient materials, and carrying out the production of the compound with the spores in a substantially vegetative growth material-free and nutrient-free aqueous medium in which the spores cannot germinate.

6. In the microbiological production of a chemical compound by fermentation of a fungi of the genus Rhizopus, the improvement which consists in first producing spores and vegetative growth material by culturing the fungi in a nutrient medium, separating the spores from the vegetative growth and nutrient materials, and carrying out the production of the compound with the spores in a substantially vegetative growth material-free and nutrient-free aqueous medium in which the spores cannot germinate.

7. In the microbiological production of a chemical compound by fermentation of a fungi of the order Mucorales, the improvement which consists in first producing spores and vegetative growth material by culturing the fungi in a nutrient medium, separating the spores from the vegetative growth and nutrient materials, and carrying out the production of the compound with the spores in a substantially vegetative growth material-free and nutrient-free aqueous medium in which the spores cannot germinate.

References Cited in the file of this patent

Peterson et al.: DMS, March 20, 1961, Journ. Am. Chem. Soc., 74, 5933–5936 (1952).

Dulaney et al.: Appl. Microbiol., 3:336–340 (1955).